United States Patent Office 3,334,124
Patented Aug. 1, 1967

3,334,124
DIFLUOROAMINO SUBSTITUTED SILANES
Samuel F. Reed, Jr., Huntsville, Ala., assignor, by mesne assignments, to the United States of America as represented by the Secretary of the Army
No Drawing. Filed Apr. 1, 1964, Ser. No. 357,021
5 Claims. (Cl. 260—448.8)

This invention relates to new chemical compounds and particularly to difluoroamino-substituted silanes.

The silanes of the instant invention correspond to the following general formula:

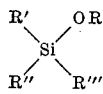

Formula 1 wherein R is a lower alkyl radical having substituted thereon at each of two adjacent carbon atoms a difluoroamino group. The variables R', R'', and R''' are each selected from the group consisting of lower alkyl, lower alkenyl, lower alkoxy, and lower alkoxy having substituted thereon at each of two adjacent carbon atoms a difluoroamino group, —NF$_2$. These silanes possess chemical and physical characteristics which make them useful as fuels for solid and liquid fueled rocket engines. For example, any one of the above silanes is a fuel constituent which can be added to a conventional rocket fuel such as kerosene or difluoroamino-substituted liquid fuels such as 2-methyl-2,3-bis(difluoroamino) propane as an additional fuel component. Because these silanes are relatively viscous, it is generally necessary to mix them with less viscous fuels in order to obtain satisfactory performance in liquid fueled engines. The amount of silane to be mixed with other liquid fuel is not critical as long as the mixture is not too viscous for use in a given rocket engine. Usually, the silane can constitute up to about 50% of the mixture.

Moreover, silanes containing at least one alkenyl group can be polymerized according to established techniques for polymerizing ethylenically unsaturated monomers. The polymers thus formed can be used as binders for solid propellants. The silanes where R', R'', and R''' are each difluoroamino-substituted lower alkoxy groups can be used as plasticizers for solid propellant formulations utilizing polymeric binders.

In accordance with the foregoing, it is an object of the present invention to provide difluoroamino-substituted silanes useful as fuel components in liquid and solid fueled rocket engines.

It is a further object of the invention to provide ethylenically unsaturated difluoroamino - substituted silanes which can be polymerized according to standard techniques for polymerizing ethylenically unsaturated compounds.

A still further object of the present invention is to provide difluoroamino-substituted silanes useful as plasticizers.

The manner in which these as well as other objects can be accomplished will become apparent from the following detailed description of the invention.

The following illustrate the groups which are represented by the variables R, R', R'', and R''' shown in Formula 1 hereinabove. The variable R can be

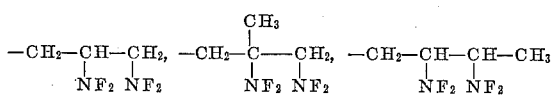

and the like. The lower alkyl, lower alkenyl, lower alkoxy, and difluoroamino-substituted lower alkoxy groups represented by R', R'', R''' include but are not limited to the following: Methyl, ethyl, propyl, isopropyl, butyl, isobutyl, tertiary butyl, vinyl, propenyl, 1-butenyl, 2-butenyl, isobutenyl, methoxy, ethoxy, propoxy, butoxy, isobutoxy, 2,3-bis(difluoroamino) proproxy, 2,3-bis(difluoroamino-butoxy), and 3,4-bis(difluoroamino) butoxy.

The compounds of the present invention are synthesized according to the following general reaction:

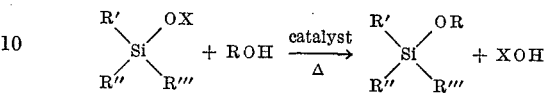

wherein X is lower alkyl, preferably methyl or ethyl, and R, R', R'', and R''' are as previously defined hereinbefore. It is obvious that for every —OR group desired on the silane produced (up to four OR groups), the silane used as a starting material must have a corresponding —OX substituent. Thus, if two difluoroamino-substituted alkoxy groups are desired, one of the three variables R', R'', and R''' must be an —OX group. If three difluoroamino-substituted alkoxy groups are desired, two variables must be —OX groups and all the variables must be of the —OX type if four bis(difluoroamino)-substituted alkoxy groups are wanted on the final product. When R', R'', or R''' are lower alkyl or lower alkenyl groups they are unaffected by the reaction. If R', R'', and R''' are lower alkoxy containing less carbon atoms than the —OR group, they will generally be replaced by the —OR group. If R', R'', R''' are lower alkoxy groups containing more carbon atoms than the —OR group, they will be substantially unaffected by the reaction.

The reaction between the silane starting materials and the difluoroamino-substituted alcohols is generally conducted at a temperature of about 75° C. to 90° C. with a molar excess of the difluoroamino-substituted alcohol. Tetra-n-butyl titanate is an excellent catalyst for the substitution reaction although the prior art discloses many other suitable catalysts.

The silanes used as starting materials are known compounds. However, the difluoroamino-substituted alcohols (ROH) used in the reaction do not appear in prior art publications. These alcohols can be prepared by reacting alkenyl esters with tetrafluorohydrazine and then transesterifying with methanol. For example allyl trifluoroacetate reacts with tetrafluorohydrazine to produce the adduct, 2,3-bis(difluoroamino) propyl trifluoroacetate. Upon transesterification with methanol 2,3 - bis(difluoroamino)propanol-1 is produced along with methyl trifluoroacetate. Similarly, vinyl trifluoroacetate yields 1,2-bis(difluoroamino)-ethanol when subjected to the same series of reactions. Other alcohols produced in the same manner and useful in the synthesizing the silanes of the present invention are 2,3-bis-(difluoroamino)-2-methyl-propanol-1; 2,3-bis(difluoroamino)butanol-1; 1,2-bis(difluoroamino) pentanol-3; and 5,6-bis(difluoroamino)hexanol-3.

The addition reaction of tetrafluorohydrazine to the alkenyl trifluoroacetate is carried out at temperatures of about 50° C. to 300° C. and preferably at about 80° C. to 100° C. The reaction time varies with the temperature but, within the preferred temperature range, the reaction time is generally about five to eight hours. A 1:1 molar ratio of reactants is satisfactory although a molar excess of tetrafluorohydrazine is preferred. There is no advantage in using more than five moles of tetrafluorohydrazine per mole of ester.

The transesterification reaction with methanol is carried out at about 65° C. to 70° C., generally with an excess of methanol in a molar ratio of methanol to ester of about 1.5:1.0 to 3.0:1.0.

The following examples illustrate the process whereby the compounds of the invention can be synthesized.

*Example I.—Preparation of 2,3-bis(difluoroamino) propanol-1*

A. To a one-liter stainless steel evacuated bomb in a liquid nitrogen bath, there was charged 7.7 grams of allyl trifluoroacetate and 10.4 grams of 98% tetrafluorohydrazine using a vacuum rack for the transfer of reactants. The bomb was permitted to warm to ambient temperature and thereafter placed in an oil bath and heated to 100° C. for a period of about five hours during which time the pressure dropped from a maximum of 56 p.s.i. to 26 p.s.i. The initial ambient pressure was 37 p.s.i. and the final ambient pressure was 9 p.s.i. After cooling to ambient temperature, the contents of the bomb were removed under vacuum into a series of cold traps located on a vacuum rack. The product fraction was collected in a Dry Ice-acetone cooled trap. The liquid fraction obtained from this trap was then distilled to give 10.76 grams of 2,3-bis(difluoroamino) propyl trifluoroacetate, B.P. 55–58° C. (16 mm.); $n_D^{20}$ 1.3540.

Calculated for $C_5H_5F_7N_2O_2$: C, 23.21%; H, 1.94%; F, 51.60%; N, 10.85%. Found: C, 23.42%; H, 2.15%; F, 50.70%; N, 12.23%.

B. To a 100 ml. round bottom flask fitted with magnetic stirrer and distillation assembly was introduced 59.5 g. of 2,3-bis(difluoroamino)-propyl trifluoroacetate and 25 ml. of anhydrous methanol. The flask was heated intermittently by means of a 65–70° C. hot water bath during a period of three hours. A total of 26.0 grams of methyl trifluoroacetate distilled from the reaction mixture. The remaining residue was distilled at reduced pressure to give 30.5 grams of 2,3-bis(difluoroamino)propanol-1, B.P. 44° C. (3 mm.). The infrared spectrum showed characteristic absorption at 2.92µ (—OH) and the 10µ–12µ region (—NF$_2$).

Calculated for $C_3H_6F_4N_2O$: F, 46.89%. Found: F, 46.6%.

By substituting other alkenyl trifluoroacetates for the allyl trifluoroacetate of Example 1, the corresponding difluoroamino-substituted alcohols have been prepared. Thus methallyl trifluoroacetate yields 2,3-bis(difluoroamine)-2-methyl propanol-1; 1-methyl-2-butenyl trifluoroacetate yields 1-methyl-2,3-bis(difluoroamino) butanol-1; 2-butenyl trifluoroacetate yields 2,3-bis(difluoroamine) butanol-1.

*Example II.—Preparation of dimethyl di-2,3-bis(difluoroamino)propoxy-silane*

A mixture of 1.48 grams (0.01 mole) of dimethyl diethoxy silane, 3.42 grams (0.021 mole) of 2,3-bis(difluoramino) propanol and 0.2 gram of tetra-n-butyl titanate contained in a three-necked flask fitted with a magnetic stirrer, thermometer, and distillation assembly was heated at a temperature of 85° C. to 90° C. for a period of twelve hours during which time a distillate boiling at 59° C. to 62° C. was collected. The infrared spectrum of the distillate was that of ethanol. After cooling to ambient temperature, the residue was stripped free of all volatile materials. The residue was then dissolved in 100 ml. of ethyl ether and then the ether solution was thoroughly washed with water. The solution was dried over anhydrous magnesium sulfate, filtered, and the ether then removed at reduced pressure. The infrared spectrum of the product showed absorption bands at 1265 cm.$^{-1}$, [(CH$_3$)$_2$—Si—]; 810 cm.$^{-1}$ [(CH$_3$)$_2$—Si—]; 1050 cm.$^{-1}$, [Si—O—C]; 850–1000 cm.$^{-1}$, (—NF$_2$). Elemental analysis was obtained to further confirm the identity of the product.

Calculated for $C_8H_{16}F_8N_4O_2Si$: C, 25.23%; H, 3.55%; F, 40.00%; N, 14.72%. Found: C, 28.29%; H, 4.09%; F, 40.88%; N, 16.97%.

*Example III*

Using the procedure of Example II and substituting trimethylethoxy silane for the dimethyl diethoxy silane, there is produced trimethyl [2,3-bis(difluoroamino)propoxy] silane. The molar ratio of alcohol to silane can be reduced since there is only one ethoxy group present on the silane reactant, a ratio of 1.1:1.0 being satisfactory.

*Example IV*

By following the procedure of Example II and substituting vinyl triethoxy silane for dimethyl-dimethoxy silane, there is produced vinyl-tri [2,3-bis(difluoroamino)-propoxy] silane. The molar ratio of alcohol to silane is increased to about 3.1:1.0.

*Example V*

Following the procedure of Example II with the substitution of tetraethoxy silane for the dimethyl dimethoxy silane and increasing the molar ratio of alcohol to silane to about 4.2:1.0, there is produced tetra [2,3-bis(difluoroamino)propoxy] silane.

The above description is for purposes of illustration only and no undue limitation should be attributed thereto except as reflected in the appended claim.

I claim:

1. A compound corresponding to the formula

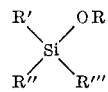

wherein R is a lower alkyl radical having substituted thereon at each of two adjacent carbon atoms a difluoroamino group and R′, R″, and R‴ are each a member selected from the group consisting of lower alkyl, lower alkenyl, lower alkoxy, and lower alkoxy having substituted thereon at each of two adjacent carbon atoms a difluoroamino group.

2. The compound corresponding to the formula

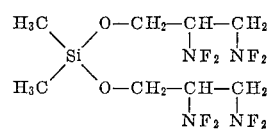

3. The compound corresponding to the formula

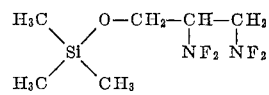

4. The compound corresponding to the formula

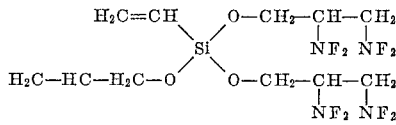

5. The compound corresponding to the formula

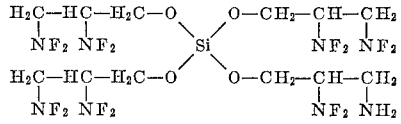

References Cited

UNITED STATES PATENTS 2,972,598    2/1961    Morehouse _____ 260—448.8 X

TOBIAS E. LEVOW, *Primary Examiner.*

CARL D. QUARFORTH, REUBEN EPSTEIN,
*Examiners.*

L. A. SEBASTIAN, P. F. SHAVER, *Assistant Examiners.*